Nov. 23, 1943.        E. E. CAHOON        2,335,043
CONVEYER MECHANISM FOR CANDY ENROBERS AND THE LIKE
Filed June 5, 1942        3 Sheets-Sheet 1
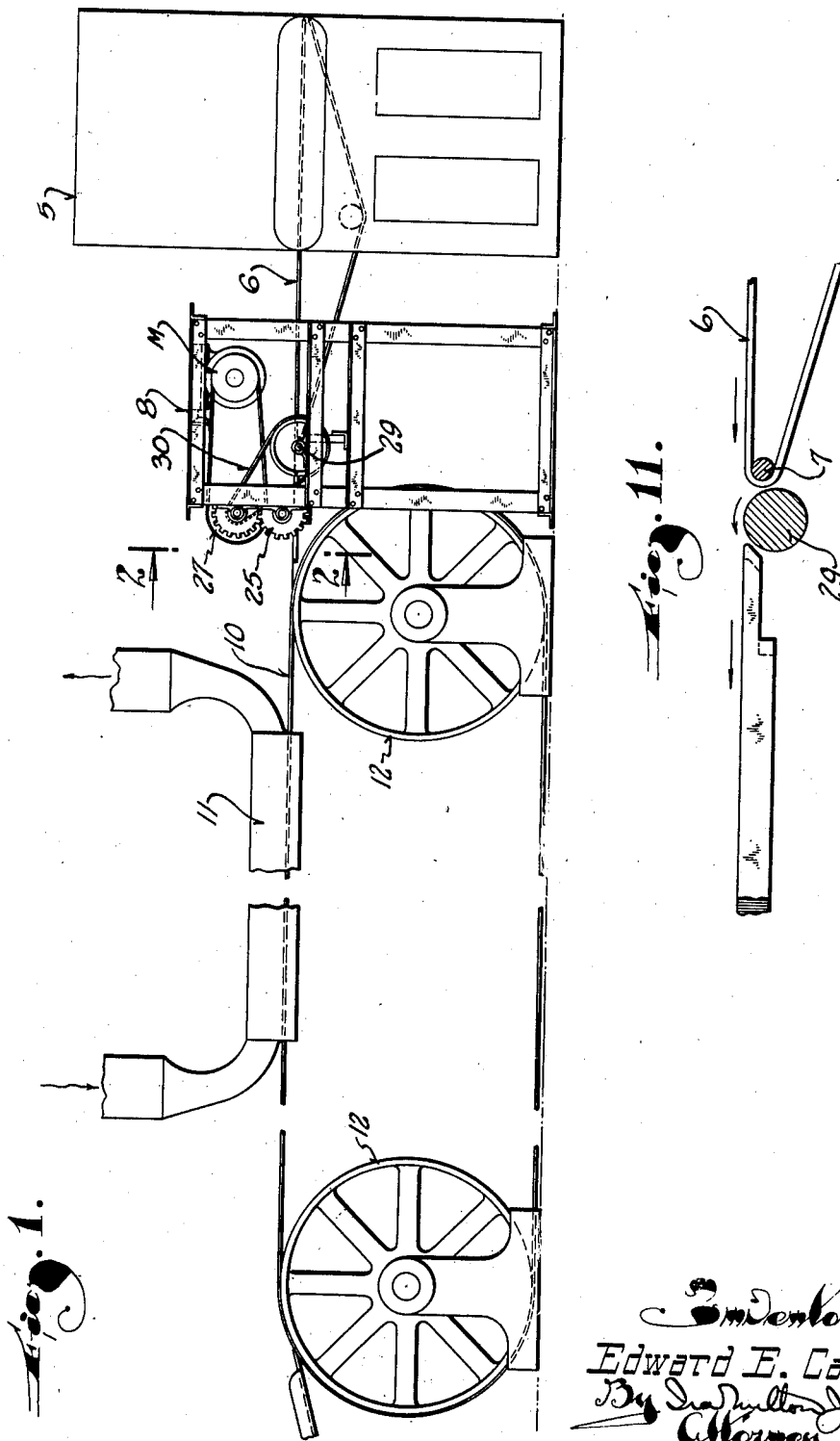
Inventor
Edward E. Cahoon

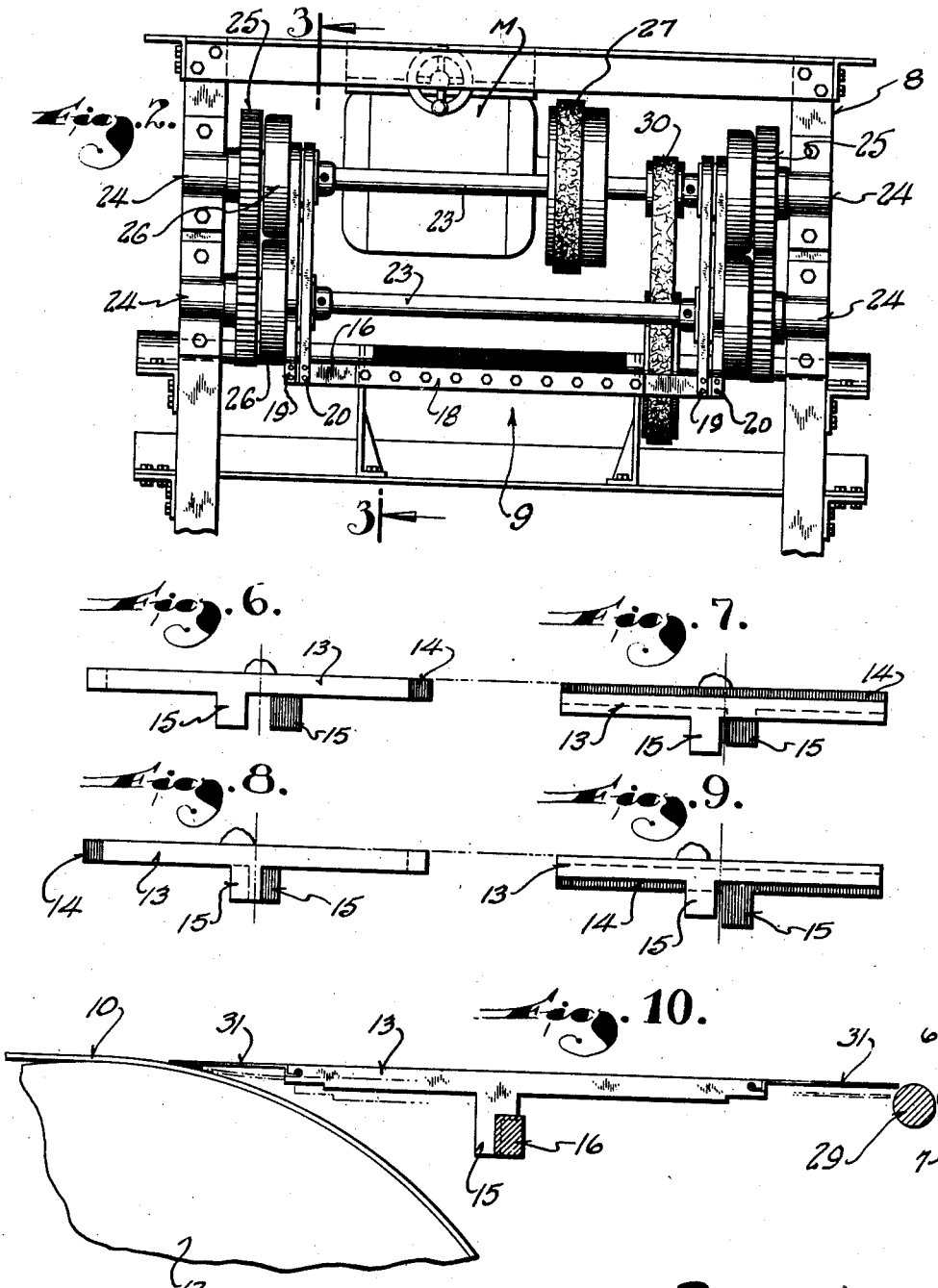

Nov. 23, 1943.  E. E. CAHOON  2,335,043
CONVEYER MECHANISM FOR CANDY ENROBERS AND THE LIKE
Filed June 5, 1942   3 Sheets-Sheet 3
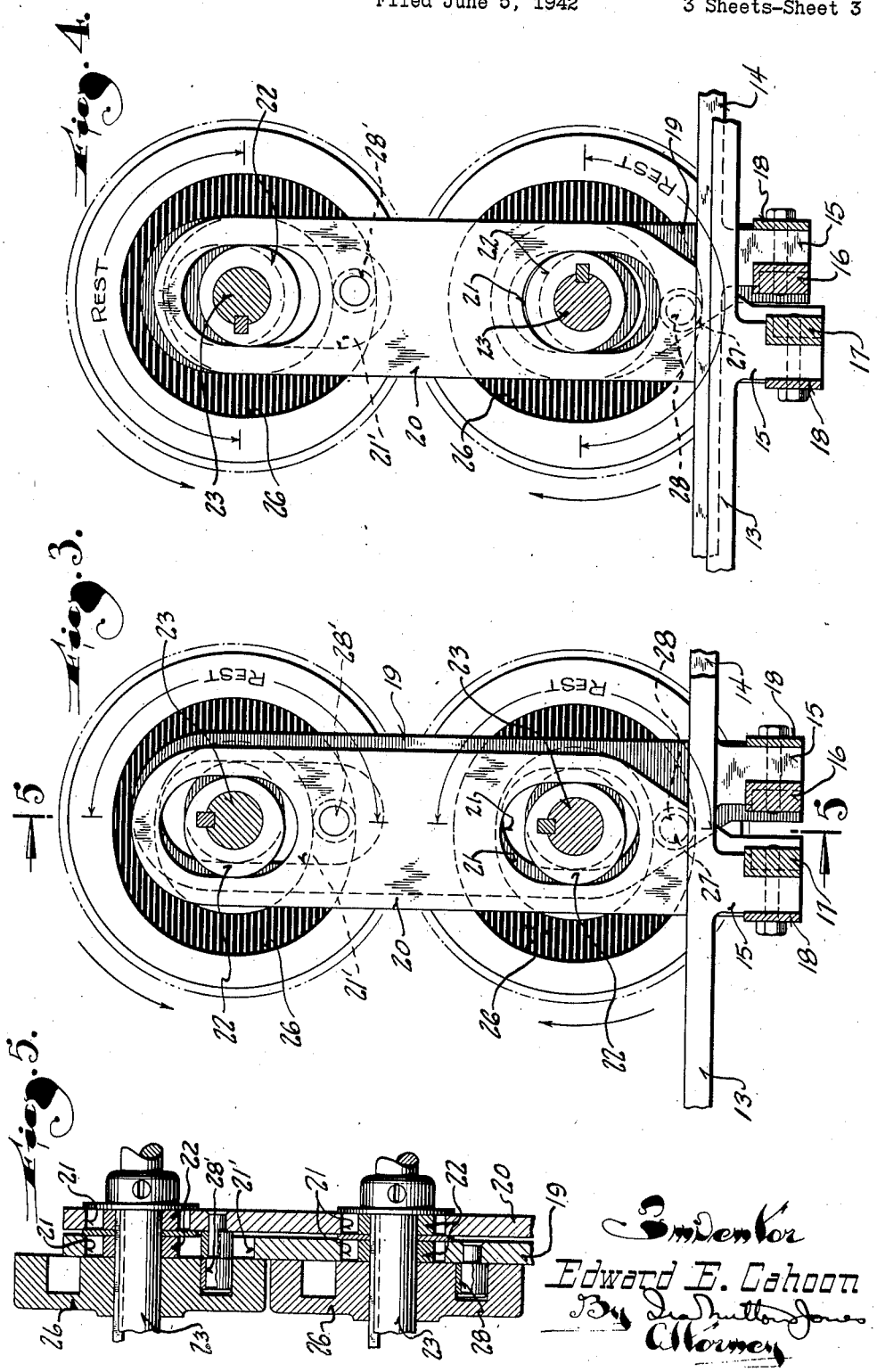

Patented Nov. 23, 1943

2,335,043

UNITED STATES PATENT OFFICE 2,335,043

CONVEYER MECHANISM FOR CANDY ENROBERS AND THE LIKE

Edward E. Cahoon, Racine, Wis.

Application June 5, 1942, Serial No. 445,858

2 Claims. (Cl. 198—106)

This invention relates to conveying apparatus and refers particularly to conveyers for use with candy making equipment and in the baking industry with chocolate enrobing equipment.

In the manufacture of candies and cookies and other similar confections, long endless conveyers are used to carry the confections through treatment zones for drying and hardening. One such instance of the need for long endless conveyers is in conjunction with chocolate enrobing machines in which the cream fillings and other interiors of chocolates and cookies are enrobed and deposited on a conveyer which carries the enrobed pieces through a long cooling zone or chamber.

Heretofore the endless conveyers employed for this purpose consisted of fabric or woven wire belts. These belts could be flexed over relatively small pulleys. Hence, it was possible with these conveyers to place two of them end to end without entailing difficulties in the transfer of the pieces from one conveyer to the other.

It has been found more practical, however, to use flexible sheet metal instead of fabric or woven wire in these endless conveyers, but such metal conveyers cannot be flexed over small diameter pulleys. The pulleys or drums must be quite large. As a consequence the circumference of the conveyer as it travels around the pulley falls away gradually from the plane of the top conveying stretch. This makes it impossible to bring two endless conveyers arranged end to end close enough together to enable transfer of the pieces from one conveyer to the other without entailing objectionable dropping and rough handling of the pieces.

Merely to dispose the feeding conveyer at a higher elevation than the receiving conveyer with an inclined chute bridging the space therebetween would not do where the equipment is designed to handle freshly enrobed chocolates or freshly baked cookies. Such articles, obviously, cannot be slid along a supporting surface.

It is therefore an object of this invention to provide a conveyer particularly adapted for handling freshly enrobed chocolates and similar articles which is so constructed and designed that transfer from one endless conveyer to the other is effected smoothly and without mishandling of the pieces even though one of the endless conveyers is a steel band trained over large diameter drums or pulleys.

More specifically, it is an object of this invention to provide a transfer mechanism for transferring articles from one endless conveyer to another substantially along the same horizontal plane as the conveying stretches of the endless conveyers and without subjecting the articles to rough handling.

Another object of this invention is to provide a transfer mechanism for the purpose described which is so designed that its receiving and discharging ends can be brought closely adjacent to the points of tangency between the top conveying stretches of the endless conveyers and the pulleys over which they are trained.

Still another object of this invention is to provide a transfer table of the character described consisting of two sets of longitudinal supporting rails interleaved to form supporting surfaces and successively actuated with an oscillatory reciprocating motion so that articles deposited thereon are "walked" or intermittently advanced along the length of the rails.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof and in which:

Figure 1 is a general view in side elevation of a chocolate enrober and the conveying mechanism by which the freshly enrobed chocolates are carried through a cooling and drying zone;

Figure 2 is an enlarged cross sectional view taken through Figure 1 on the plane of the line 2—2 and illustrating particularly the transfer mechanism by which the freshly enrobed pieces are transferred from the discharge conveyer of the enrober to the steel band conveyer by which they are carried through the cooling and drying zone;

Figure 3 is a detail sectional view taken through Figure 2 on the plane of the line 3—3 and illustrating the mechanism by which the supporting rails of the transfer table are actuated;

Figure 4 is a view similar to Figure 3 but showing the parts in another position;

Figure 5 is a detail sectional view taken through Figure 3 on the plane of the line 5—5;

Figures 6, 7, 8 and 9 are side views of the supporting rails which comprise the transfer table illustrating the manner in which their oscillatory reciprocating motion advances the pieces deposited thereon;

Figure 10 is an enlarged side view of the transfer table shown in relationship to the receiving end of the conveyer which carries the pieces through the cooling and hardening zone; and Figure 11 is a view similar to Figure 10 but showing a slightly modified form of supporting rail for the transfer table.

Referring now particularly to the accompanying drawings, in which like numerals indicate like parts, the numeral 5 designates a chocolate enrobing unit where the cream and other fillings of chocolates are enrobed with molten chocolate and deposited on a discharge conveyer 6. The conveyer 6 is a flexible endless fabric or woven wire belt trained over suitable pulleys and properly supported to have its top conveying stretch substantially horizontal and projecting from the enrober to a discharge point defined by an idler roller 7 carried by a frame 8.

The frame 8 mounts the transfer mechanism, indicated generally by the numeral 9, by which the freshly enrobed pieces of chocolate are transferred from the discharge conveyer 6 onto a long endless conveyer 10 which carries the pieces through a cooling and drying chamber or zone 11.

The conveyer 10 is long enough and moves at a slow enough speed to properly condition the candy in its passage through the chamber 11 which is supplied with properly conditioned air in the customary manner.

The conveyer 10 consists of an endless band of sheet metal, preferably steel, trained over pulleys 12. In view of the use of a steel band for the conveyer 10, which is far preferable to fabric or woven wire for this purpose, it is, of course, necessary that the pulleys or drums 12 over which the band is stretched be of relatively large diameter.

If the adjacent rollers over which the conveyers 6 and 10 are trained were both of small diameter the conveyers could be brought close enough together so that a small diameter transfer roll would suffice to transfer the pieces from one conveyer to the other. However, by virtue of the large diameter of the pulleys 12, the cylindrical surface of the conveyer 10 falls away quite gradually from the horizontal plane along which the pieces are conveyed, thus making it impossible to approach close enough to the line of tangency between the conveying stretch of the conveyer 10 and the pulley to avoid an abrupt break and/or rough handling of the pieces.

The present invention overcomes this difficulty through the provision of the transfer mechanism indicated generally by the numeral 9. This transfer mechanism is mounted in the frame 8 and consists of two sets or groups of spaced parallel supporting rails 13 and 14 with the rails of one set interleaved between those of the other.

These rails are flat bars and have but a slight clearance therebetween so that the rails of the two sets conjointly form substantially a flat table upon which the pieces being conveyed rest and along which they are intermittently advanced by successive oscillatory reciprocating motion of the two sets of supporting rails.

Figures 6, 7, 8 and 9 illustrate the manner in which the pieces are advanced along the transfer table. As here shown, the descending rails 13 leave the pieces resting on the rails 14 which then move forwardly to advance the pieces. Next the supporting rails 14 descend and leave the pieces resting on the rails 13 (which by this time are back to their previous elevation), whereupon these latter rails are advanced forwardly so that in effect the pieces resting on the table are "walked" along the length of the transfer table.

To mount and actuate the longitudinal supporting rails, each individual rail has a depending foot 15. The supporting feet 15 of the rails 13 are engaged in slots formed in the top and side of a cross bar 16 and the feet 15 of the rails 14 are seated in similar slots or notches in a cross bar 17, the positions of the slots or notches of one cross bar being staggered with relation to those of the other. Clamping bars 18 extending across the full width of the transfer table are secured to the cross bars 16 and 17 to clamp the attaching feet of the rails to the cross bars.

The ends of the cross bars are attached to vertical upwardly extending carriers 19 and 20 which provide cam followers and respectively support the sets of rails 13 and 14. Both upright carriers or arms 19 and 20 have vertically elongated cam pockets 21 to receive and accommodate eccentric cams 22 fixed to cam shafts 23. The cam shafts 23 are superimposed one above the other and extend transversely across the frame 8 above the transfer table, being suitably journalled in bearings 24 carried by the frame 8.

Sets of meshing gears 25 on the opposite ends of the cam shafts tie them together for rotation in unison in opposite directions. The upper cam shaft is driven from a suitable power source M through a belt and pulleys 27.

From Figures 3 and 4 it will be seen that the eccentric cams 22 which engage in the cam pockets 21 of the arms 19 are set diametrically opposite the cams which engage in the pockets of the arms 20. It will also be noted from Figure 4 that the length of the vertical cam pockets 21 is sufficient to guard against any up and down motion being imparted to the arms 19 and 20 by the eccentric cams. Hence, during operation of the machine, the eccentric cams 22 merely effect the reciprocal horizontal motion of the supporting rails.

The required vertical motion to bring about the oscillatory reciprocation is obtained from box cams 26 fixed to the cam shafts outwardly of the overlying supporting arms 19 and 20. The box cams 26 on the lower cam shaft are engaged by cam followers 28 fixed to the arms 19, and the box cams 26 on the upper shaft are engaged by cam followers 28' fixed to the arms 20. Inasmuch as the cam followers 28' must project through the arms 19 to reach their box cams, the cam pockets 21' in the arms 19 are elongated as clearly shown in Figures 3 and 4.

In operation, as noted hereinbefore, the eccentric cams 22 provide alternate reciprocatory motion for the supporting rails and the box cams effect alternate up and down motion so that the net result is successive and alternate oscillatory reciprocation.

To properly time the vertical motion produced by the box cams 26, each box cam is concentric 180° and eccentric for the other 180° and these cams are so arranged on the shafts that one lifts its set of rails while the other allows its set of rails to descend.

The coordinated vertical and horizontal motions obtained by this arrangement of cams advances the articles deposited on the transfer table with a step-by-step motion to carry them from the discharge conveyer 6 to the long conveyer 10.

At the end of the discharge conveyer 6 a small diameter roll 29 continuously revolves. This roll is driven from the top cam shaft by a belt 30, and facilitates the transfer of the pieces from the conveyer 6 to the transfer table.

While it is possible to taper the rails 13 and 14 or reduce their height, as shown in Figure 11, to have the ends thereof closely adjacent to the roll 29 and the cylindrical surface of the conveyer 10 as it goes into its horizontal conveying stretch, it is preferable to provide thin flexible fingers 31 fixed to and projecting from the ends of the rails with their top surfaces flush with the tops of the rails. These fingers enable the supporting surface of the table to be brought very close to the cylindrical surfaces of the roll 29 and the conveyer 10.

In fact, the fingers 31 rest directly on the curved surface of the conveyer 10 as shown. This is desirable and is possible only because of the flexibility of the fingers, for as shown in dotted lines the fingers engaged with the conveyer surface must flex or yield as the rails are moved downwardly. It will also be apparent that while one set of fingers is flexed in this manner the other set, carried by the active rails, provides an unbroken bridge to the flat stretch of the conveyer 10.

From the foregoing description, taken in connection with the accompanying drawings, it will be readily apparent to those skilled in the art that this invention provides a practical solution to the problem of transferring freshly enrobed chocolates and other similar products from one endless belt conveyer to another and especially where one of the conveyers is trained about large diameter pulleys or drums.

What I claim as my invention is:

1. In a conveyer of the character described: two sets of spaced parallel supporting rails arranged with the rails of one set interleaved with the rails of the other set so that said rails conjointly form a substantially flat supporting surface; individual flexible fingers fixed to the ends of the rails providing substantially feathered extended edges for the ends of said rails so that the ends of the transfer table formed conjointly by the rails and their fingers may be brought closely adjacent to points of tangency between endless belt conveyers and pulleys over which they are trained; and means for successively imparting an oscillatory reciprocating forwarding motion to said sets of rails and their fingers.

2. Transfer mechanism for bridging the space between the ends of two conveyers, at least one of said conveyers being trained over a relatively large diameter pulley, said transfer mechanism comprising: two sets of spaced parallel supporting rails arranged with the rails of one set interleaved with the rails of the other set so that said rails conjointly form a substantially flat supporting surface in line with the flat stretches of the conveyers; individual flexible fingers fixed to the ends of the rails providing substantially feathered extended edges for the ends of said rails, the flexible fingers adjacent to the large diameter pulley overlying the curved surface of the conveyer trained thereover; and means for successively imparting an oscillatory reciprocating forwarding motion to said sets of rails and their fingers, the fingers adjacent to the large diameter pulley being flexed by their engagement with said conveyer during downward motion of the rails.

EDWARD E. CAHOON.